Dec. 31, 1963 W. G. GREEN 3,115,776
METHOD OF FORMATION TESTING IN PETROLEUM WELLS
Filed Aug. 29, 1955 3 Sheets-Sheet 1
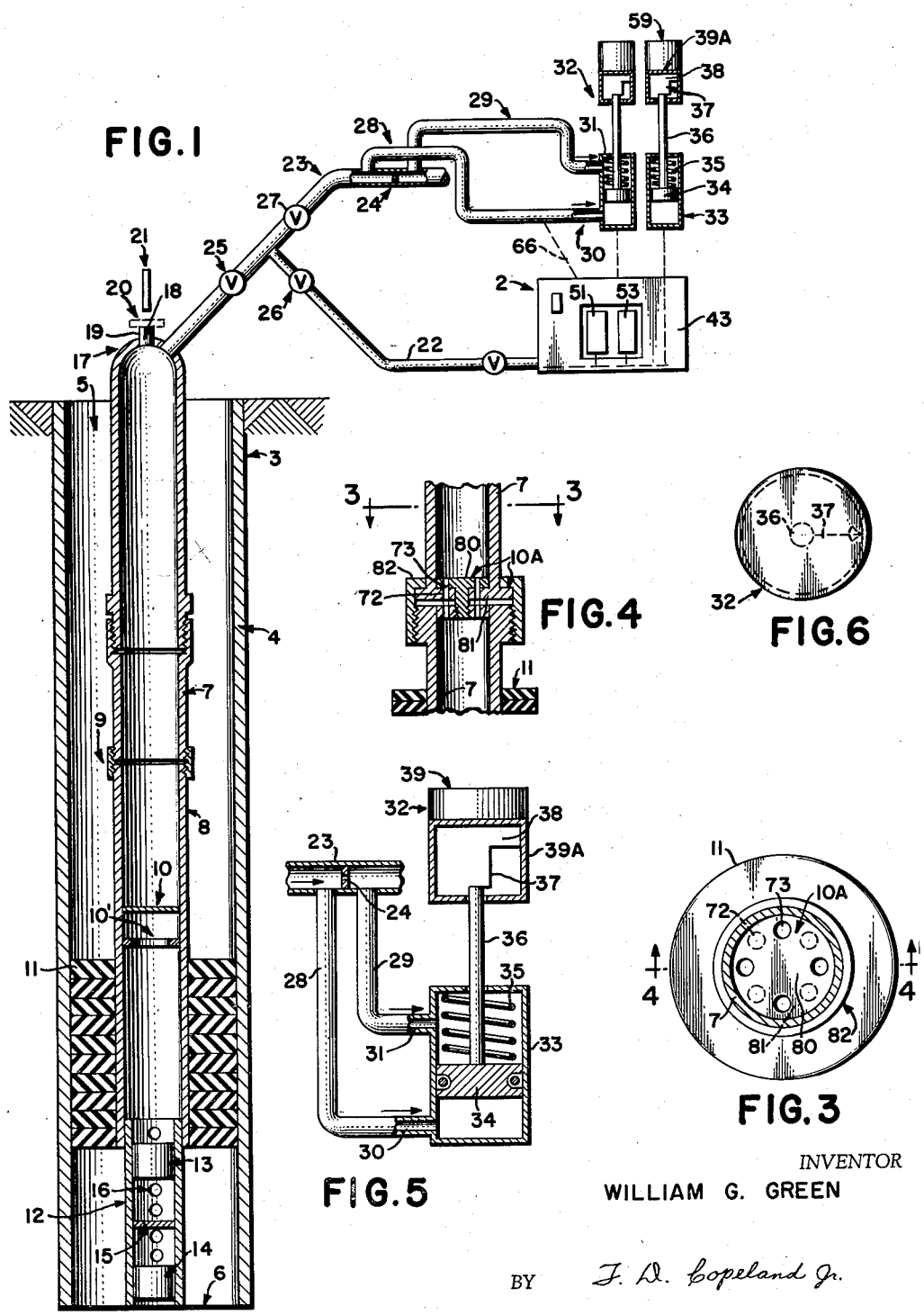
INVENTOR
WILLIAM G. GREEN
BY J. D. Copeland Jr.
ATTORNEY

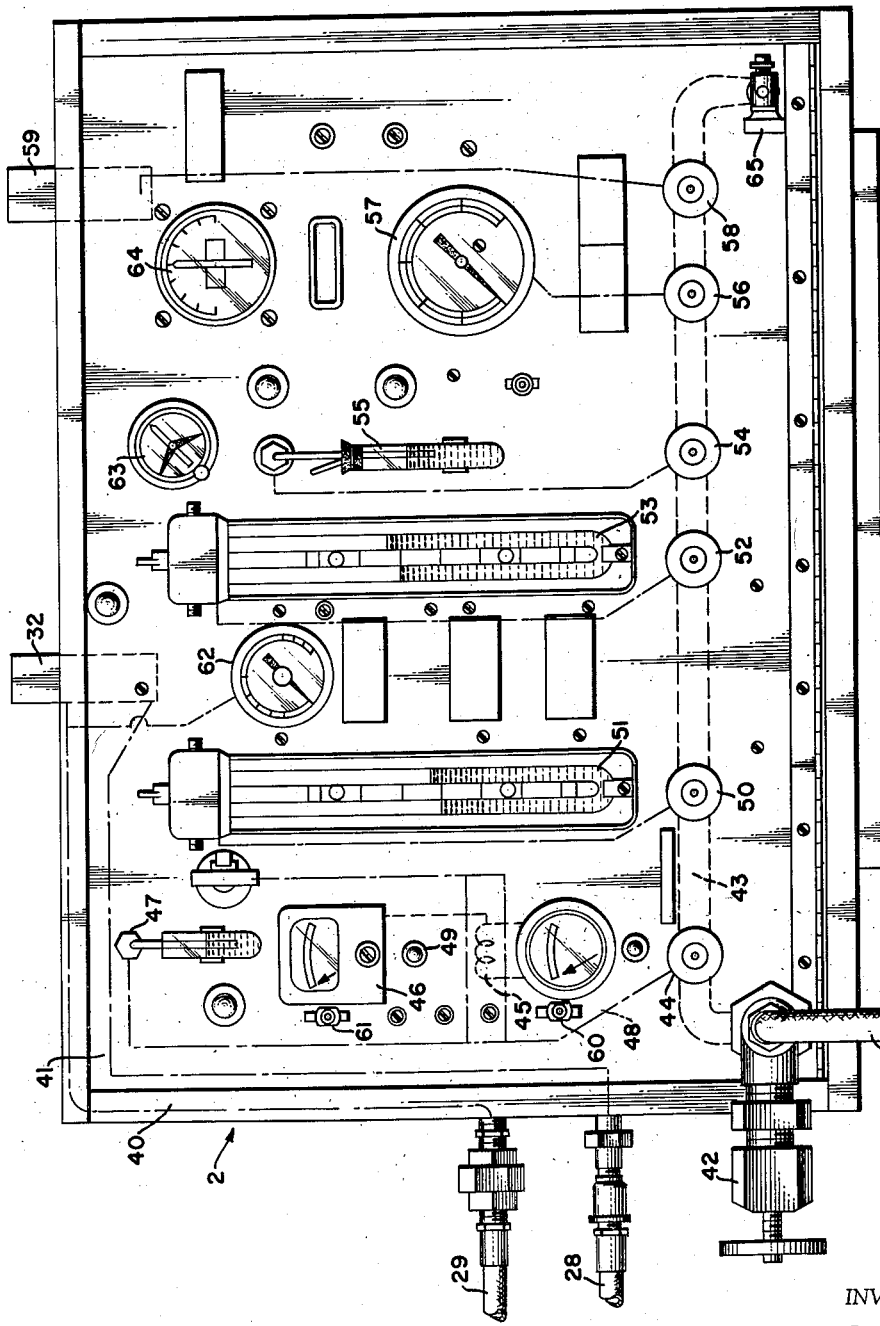

Dec. 31, 1963   W. G. GREEN   3,115,776
METHOD OF FORMATION TESTING IN PETROLEUM WELLS
Filed Aug. 29, 1955   3 Sheets-Sheet 3
FIG. 7
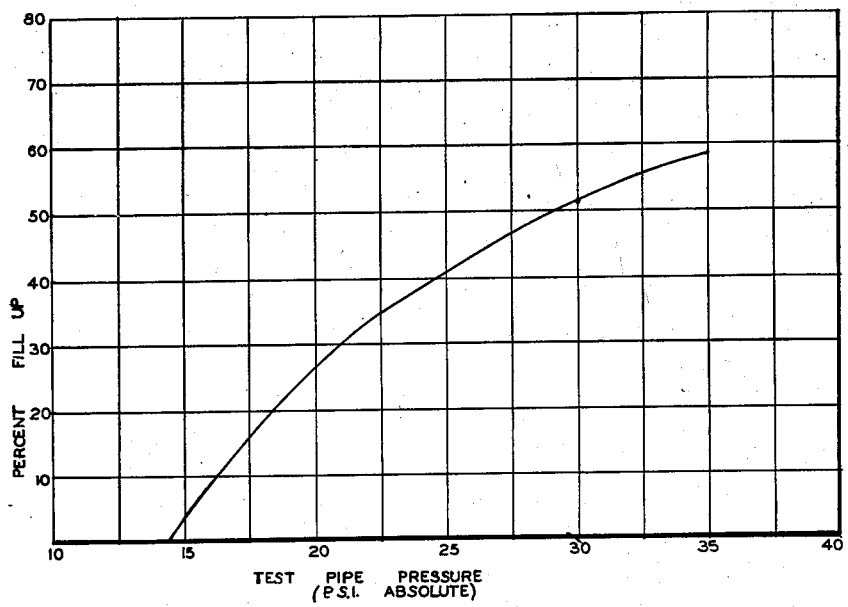
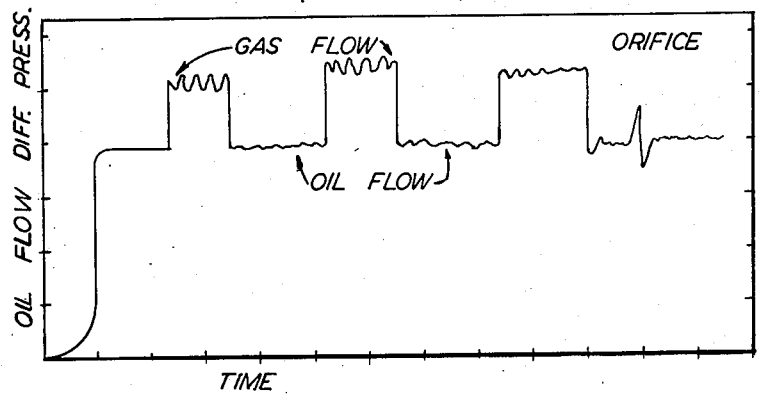
FIG. 8
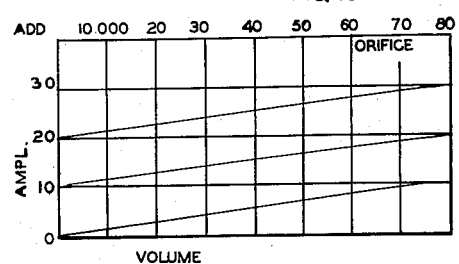
FIG. 10
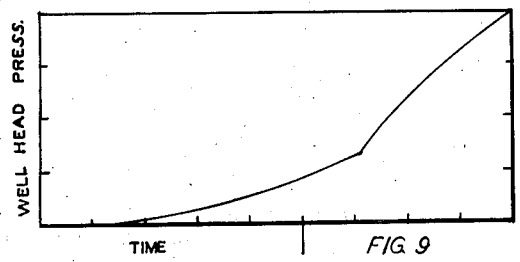
FIG. 9
INVENTOR.
W. G. GREEN
BY
F. D. Copeland Jr.
AGENT

United States Patent Office 3,115,776
Patented Dec. 31, 1963

3,115,776
METHOD OF FORMATION TESTING IN PETROLEUM WELLS
William G. Green, 600 E. 4th St., Tulsa, Okla., assignor of one-half to Dale M. Moody, Tulsa, Okla.
Filed Aug. 29, 1955, Ser. No. 531,101
4 Claims. (Cl. 73—155)

This invention relates generally to a method for testing oil wells to obtain data pertinent to the type and quantity of fluid in the producing formation and more specifically to a method for obtaining this data immediately after drilling a well either before or after setting the casing and prior to placing in the tubing or commencing a production operation.

The primary object of this invention is to provide a simple, economical and reliable method of obtaining data including detecting small amounts of oil or gas from a possible producing formation, which data is obtainable in a degree of precision not heretofore utilized for tests of this type.

Another object is to provide a method for obtaining production data at a time when the drilling equipment is still at the well site and for utilizing this equipment for obtaining the desired data and thus eliminating the need for additional expensive equipment, or for re-rigging to do necessary additional work.

A further object of this invention is to provide a method for formation testing in which the presence of any fluid such as oil, gas, water, or drilling mud at a specific location in the well bore is identified and recorded at the surface of the well.

An additional object is to provide a method for formation testing in which the rate of production of any fluid from a specific location in a well bore is obtainable and recorded at the surface of the well.

And yet another object of this invention is to provide a method for formation testing in which additional production data is obtained from a combination of the bottom hole pressure and the pressures taken at the surface.

A further object is to provide a method of obtaining well data which comprises lowering a sealed tube into a well bore and opening the lower end of the tube at the desired test depth and measuring the reaction of the entrapped air in the tube to the entrance of the formation fluid at its pressure or pressures.

As previously stated a primary object of this invention is to provide a method of detecting small amounts of oil or gas in a borehole. As the search for oil and gas continues, the number of large and easily found oil deposits is constantly diminishing. Many oil companies are now turning to "secondary recovery methods" and utilizing the so-called "marginal producing horizons" in order to maintain their oil reserves.

Such a marginal area is the "Spraberry" Zone of Scurry County, Texas. In this field there is a huge volume of dense sandstone, that has been ground and compacted by the earth movements. The sandstone is fractured in every direction, but is tightly pressed together. The porosity is small, but where it contains oil, the extremely large volume of the sand will permit a profitable recovery.

Prior to the instant invention, very little effort has been spent toward developing a reliable device for detecting the presence of these small quantities of our natural resources for the reason that, until very recently, even if their presence were known there did not exist a satisfactory method of economically recovering them. However, now that a satisfactory method, known in the trade as the "Hydrofrac" method has been developed, it becomes increasingly important that the small quantities referred to can be detected and evaluated. The present specification discloses such a method.

It has been long known in the physics of gases that as the pressure varied, the volume also varied in proportion. This relationship was first stated by Robert Boyle in the 17th century and may be expressed as:

$$P_1V_1 = P_2V_2 = P_3V_3 \ etc. = K$$

From this formula it is obviously possible to solve for a new V if the P is known, and this is what is done in the instant method invention of testing wells by applying extremely sensitive measuring equipment at the top of a well and sealing up the drill pipe until the time sequence is started and then measuring the increase in trapped air and gas pressure to determine therefrom the production volume of the liquid under pressure entering the drill pipe and causing the measured increase in trapped air pressure.

Another object of this invention is to provide a method whereby to determine the flowing rates of two fluids such as oil and gas, gas and water, etc., produced simultaneously in slugs or separated units by the process of observing difference in differential pressure between gaseous and fluid portions.

For any given orifice it is known that, under the same pressure, gas flowing therethrough creates a greater differential pressure than oil, especially under conditions where large differential in pressure such as exists between wellhead pressure and the relatively low pressure in an open end flow line. This invention utilizes this differential to distinguish between gas and oil flow, and to compute their respective volumes.

The apparatus disclosed provides means for immediately determining various operating conditions, such as whether or not the drill pipe leaks, and how much; whether the tool (or valve) opened; whether or not the perforations in the anchor have plugged with mud or cutting; how long to run the test; and, if the valve is closed at the end of the test.

These and other objects will be apparent from an examination of the following specification and drawings in which:

FIG. 1 represents an outline schematic drawing showing the installation of the apparatus of the instant invention at a well site.

FIG. 2 is a front elevational view of the instrument panel and associated parts shown partially in schematic.

FIG. 3 is a horizontal sectional view of the pipe valve taken along the lines 3—3 of FIG. 4.

FIG. 4 is a cross-sectional view taken along the lines 4—4 of FIG. 3.

FIG. 5 is an elevational view partly in vertical section and partly in schematic illustrating one recorder and its relation to the detecting system of this invention.

FIG. 6 is a plan view of the recorder used in this invention.

FIG. 7 is a graphical illustration of the pressure vs. percent fill-up of the drill pipe curve.

FIG. 8 is a graphical illustration of a typical recording of the clock drum chart in the differential pressure recorder.

FIG. 9 is a graphical illustration of the clock drum chart of the flowmeter recorder of this invention.

FIG. 10 is a graphical illustration of a chart prepared to give volume of flow through an orifice from a known differential pressure.

Referring now more particularly to the characters of reference on the drawing it will be observed in FIG. 1 that the analyzer 2 of this invention is used at a well site to obtain information directly from the well bore which may have open sidewalls 3 as would occur immediately after drilling, or the borehole may include casing 4 as would occur if the equipment is to be used in old wells for purposes previously explained. If the well is cased, it may be necessary to perforate the casing in the area to be tested to expose the formation gases and fluids. The well bore, indicated generally at 5, is usually of considerable depth and the active portion thereof terminates at the bottom of the hole 6 or at a bottom plug (not shown).

Prior to running the formation test, the drill pipe 7 is withdrawn from the borehole 5 and the drill bit (not shown) is removed, and in its place a test pipe indicated at 8 is installed by means of a threaded collar 9. Pipe 8 includes a frangible disc 10 which seals the internal area of the test pipe and consequently the entire drill pipe 7 against the entrance of fluid. Below disc 10 a conventional packer 11 seals off the area between the outer circumference of the test pipe 8 and the inner circumference of the casing 4 (or borehole 3). A length of pipe known as the anchor 12 extends from within packer 11 and pipe 8 to the bottom 6 of the borehole 3 or to the bottom plug, if same is used to provide a false bottom to the borehole. Within the anchor 12 are installed a pair of bottom hole pressure recorders 13 and 14 with a blank-off disc 15 usually separating the recorders. Holes 16 in anchor 12 expose the recorders 13 and 14 to the fluid pressure in the vicinity of the formation being tested. The gas pressure below disc 10 will adjust to formation pressure and will remain static as long as the disc remains intact; the liquid pressure will also adjust to a static pressure if there is no flow, as will be the case when the disc 10 is unbroken.

At its upper end, drill pipe 7 is sealed by a cap 17 which includes a centrally located opening 18 in an upstanding threaded nipple 19 to the interior of drill pipe 7. Nipple 19 is sealed when not in use by a plug 20. When plug 20 is removed a rod 21 may be dropped through the nipple 19 to fracture disc 10 and let in formation pressure. Plug 20 must then be quickly replaced to prevent escape of internal pressure from pipe 7. Of course, the frangible disc 10 may be replaced by a conventionally valve indicated schematically at 10A in FIG. 3.

A static take-off line 22 directs pressure from cap 17 to the pressure-volume analyzer 2 and a flow line 23 directs pressure to, and through an orifice 24 about which other important measurements are to be taken. Valves 25–27 direct the flow to orifice 24 and/or bubbles line 66 or line 22 as required.

The flowmeter circuit of this invention will supply valuable data for production computation including initial open flowing pressure, final flowing pressure, the differential pressure across an orifice 24 in the flow line for the purpose of calculating the volume of flow, rate of flow, and the oil-gas ratio. By means of flowmeter gage 62 a visual indication is obtained of the back pressure side of orifice 24. High and low pressure lines 28 and 29 from opposite sides of orifice 24 connect to fittings 30 and 31 respectively of a clock actuated differential pressure recorder 32. This differential recorder is shown in FIG. 5 to include a cylinder 33 surrounding a vertically moving piston 34 retained in its neutral position by spring 35. Piston rod 36 extends through the top of cylinder 33 and contains a marking stylus 37 which records pressure against time on chart 38 of drum 39A of clock unit 39. Drum 39A moves much faster than conventional clock driven units so that short period, differential pressures show up on chart 38. The use of this chart is seen in FIG. 8 wherein the distinct surges in pressure indicate the presence of oil and the pressure of gas with the oil, the area under the curve represents the volume of flow, and the volume per unit of time is the rate of flow.

The gas-oil ratio may be calculated as previously described, or it may be determined physically along with the determination of the height of fluid with the apparatus of this invention by the method of closing the conventional valve 10' near the bottom of drill pipe 7, and raising the drill pipe to the surface. As the pipe joints are broken at the surface and counted the exact height is determined when the liquid height is located in the section where hammer tapping indicates fluid. After this height is located, the next drill pipe joint is broken and the fluid spills out, but enough is recovered to provide samples for testing the fluid.

In FIG. 2 the instrument box of analyzer 2 may be seen to include a case 40 in which resides a panel 41 containing on its front side the instrumnets to be visually observed. Near the bottom of panel 41 a series of valves are installed in static line 22 from drill pipe 7. Valve 42 is an inlet valve to admit pressure to test line 43. Valve 44 admits pressure to the hot filament gas detector unit 45, which indicates on gage 46, and to a gas bubbler 47. Line 48 includes a knob controlled rheostat of a Wheatstone bridge or "balance" 49 ahead of gage 46 and gas bubbler 47. Test line 43 proceeds to valve 50 which selectively connects it with a water manometer 51 which detects very small pressures (0–6 in. $H_2O$). The next valve 52 in line 43 is for directing pressure into the mercury manometer 53 for detecting moderate pressures (0–6 in. Hg). Valve 54 admits fluid into bubbler 55 and valve 56 connects the test line 43 to a Bourdon gage 57 to indicate large pressures in the well bore. Valve 58 connects line 43 to a clock actuated recorder unit 59 so that a permanent record may be taken of the pressure build up. Other instruments on the panel 41 include an "Off-On" switch 60, a "Hi-Lo" switch 61, a flowmeter 62, a clock 63, and a barometer 64. Test line 43 also includes a bleeder valve at its far end.

As soon as anchor 12 and packer 11 have been set on bottom 6, the connections are made as shown in FIG. 1, at 19, 22, 25 and 26, and before bar 21 is dropped, or the valve 10' is opened by rotation of the pipe, plug 20 is closed and the water manometer 51 is observed. If there is a gradual pressure build-up, since the valve 10' is closed, or the disc 10 is intact, then the buildup is due to a leak in the pipes 7 or 8. Observation of the amount of pressure buildup over a period of ten minutes or so, will permit the determination of the amount of fluid entering the pipe, as well as the rate. This may be used to correct subsequent calculations, or, in extreme cases, this information may justify correction measures to stop the leak.

When the bar 21 is dropped and the disc 10 is broken, or the valve 10' is opened, as the case may be, there is a sudden release of the pent-up and highly pressurized air that was trapped in the packer and anchor, below valve 10' or disc 10. This causes a considerable surge in the water manometer 51, and is positive proof of the opening of the disc or valve. Closing of the valve at end of test is verified by a cessation of increase of pressure.

Almost without exception any sand or lime zone in a borehole has some porosity, however small, and the hydrostatic pressure of the hole full of drilling mud has pushed a small amount of fluid back into these zones, creating a small pressure on the gases occupying this pore space. Thus, as soon as the valve or disc is opened, and the original surge of compressed air is noted, there will be an additional small increase of pressure which soon becomes static. Observation of this small increase indicates that the tool is not plugged. A continued increase, due to production from the tested zone, likewise indicates proper functioning of the setup.

In one typical operation, the PV analyzer 2 is set up on the derrick floor near the well bore 5 and a drill pipe 7 is properly outfitted and lowered into the well through casing 4 until anchor 12 rests on the bottom 6. Lines 25, 29, and 23 are all properly connected between cap 17 and analyzer 2 or allied equipment.

To commence operation, the operator removes plug 20 and drops rod 21 through opening 18, which after a few seconds while the operator replaces plug 20 falls to and fractures frangible disc 10 near the bottom of drill pipe 7; or he may open a conventional valve 10' near the bottom by rotating or lifting drill pipe 7. Formation gases and fluid enter ports 16 to bottom hole recorders 13 and 14 and create a pressure inside drill pipe 7 which compresses the atmospheric pressure existing inside pipe 7, and line 22 carries this pressure, however small, to water manometer 51 for visual reading, and simultaneously through test line 43 to pressure recorder 59, which records not only the minute pressure which may be present but also the time it took to build up this pressure which is important in determining the rate of flow. As the pressure builds up in manometer 51 until it equals full scale, valve 50 (FIG. 2) is closed and valve 52 is opened to show the pressure on mercury manometer 53 until the pressure has built up to its full scale. At this point, valve 52 is closed and valve 56 is opened so that the full pressure may be read on pressure gage 57.

The reason for measuring the pressure in stages such as this is that high pressure gages as used in oil field work do not show an accurate reading at the lower end of their scale (below 100 p.s.i.) and this early pressure is very important in the instant analysis. For instance a well that would produce 50 barrels of liquid a day would only fill a 4½ inch diameter sealed drill pipe 7 to a height of approx. 140 feet in a one hour test, and this would produce a bottom hole pressure of only 51.5 lbs., which is outside of the accurate pressure range of most recorders and pressure gauges; and yet detecting the early pressure is necessary to predict the production without requiring extended tests. Many commercially profitable wells are operating in prorated areas which permit a production of only 20 barrels a day; a well of this nature would naturally produce an even smaller test pressure. The instant invention will require an even smaller pressure reading since the pressure here is to be taken from the compressed air at the top of the drill pipe 7. FIG. 7 shows a comparison between the wellhead pressure and the percentage of fill up of the drill pipe 7; then by a calculation involving the inside diameter of the specific drill pipe the quantity of oil may be determined for a given pressure.

FIGS. 3 and 4 show an alternate valve 10A which may be used in place of disc 10 and valve 10' to both open and close off the formation below the valve. FIG. 3 shows the valve in a closed position with openings 73 of top plate valve member 80 being out of register with corresponding openings 72 of lower plate valve member 81 attached to and rotated into and out of register by pipe 7. The pipe 7 is separated to permit the valve 10A, comprised of plates 80 and 81 to be positioned therein, and is joined to provide a continuous vertical passageway through the valve 10A by collar 82. FIG. 4 is a cross-sectional view of FIG. 3 and shows valve plates 80 and 81 in their open position.

The disc 10 is represented schematically in FIG. 1; it may be included in a conventional disc holding tool identified in the trade as Johnston Disc Trip Valve, and shown on page 2733 of World Oil Composite Catalog for 1955 (for the years 1955 and 1956).

The valve 10' shown schematically in FIG. 1, may be physically represented by a conventional normally open valve identified as Johnston Trip Valve and shown on page 2733 of World Oil Composite Catalog for 1955.

Valve 10A shown in FIGS. 3 and 4 could be replaced by conventional valve known as Halliburton Oil Well Cementing Co. TC Circulating and Closed-In Pressure Valve, and shown on page 2190 of the referenced Composite Catalog.

The orifice 24, shown schematically in FIG. 1, may be physically represented by a conventional orifice known in the trade as Commercial Orifice Type D-600, and shown on page 1318 of the referenced Composite Catalog.

It will be noted that when plug 20 and valve 27 are closed, and valves 25 and 26 are opened, the recorder 59 is subject to the pressures built up within pipe 7. Before the disc is broken this pressure is obviously atmospheric, since the pipe was run into the hole filled with air. (The hole, itself, is full of mud or other fluid. Inasmuch as the PV law for gases is expressed in absolute pressures, it is necessary to read the atmospheric pressure from barometer 64, FIG. 2. All pressure reading taken from manometers, pressure gages or pressure recorders must be added to the barometric pressure to reduce them to absolute pressure.

FIG. 7 is a curve of the percentage fillup of any size or depth of drill pipe for any absolute pressure up to 35 p.s.i. The beginning pressure is taken as 14.7 p.s.i., which is sea level mean atmospheric pressure. Obviously this will vary with altitude or elevation, and with the daily variation in barometric pressure. It may be easily seen that if this curve is plotted on a sufficiently large scale, that an increase of pressure of .1 p.s.i. would represent a percentage of fill-up of about .0068%. A standard 4½ inch (dia.) API drill pipe of 4000 feet in length has a capacity of about 56 barrels. Thus the amount of fluid entering the pipe, to produce a pressure change of .1 p.s.i., in this case, would be .0068×56=0.38 bbls.

As a normal procedure, however, in view of the variation of the atmospheric pressure, the computation would be:

Computation:

$$P_1 V_1 = P_2 V_2$$

$P_1$=barometer pressure in p.s.i.
$V_1$=volume of drill pipe in bbls. (air).
$P_2$=gage reading plus barometer in p.s.i.
$V_2 = P_1 V_1 \div P_2$ (compressed air).
Production=$V_1 - V_2$ in bbls.
Production rate=production × 24 ÷ test period (T) .
Production rate=$V_1 - V_2 \times 24 \div T$ bbls./day.

If gas is produced, liquid produced may be measured by change of weight of drill pipe, or by actual measurement of number of feet of fluid in pipe while coming out of hole.

Gas produced=$V_{gas} = (V_3 - V_{liquid}) \times P_2 \div P_1 \times 5.615$ cu. ft.

where $V_3$ is the Production figure above.

Gas—oil ratio=$V_{gas} \div V_{liquid}$ where $V_{gas}$ is given in cubic feet and $V_{liquid}$ is given in barrels, and the conversion factor of 5.615 is used.

Even under conditions where there is sufficient pressure and volume of oil to flow to the surface, the hydrostatic head builds up to the point of reducing the production rate. Therefore, for the determination of the potential production of the well, it is usually only necessary to observe the pressure build-up to about twice atmospheric pressure, as this represents half of the drill pipe full of fluid. Any build-up curve of this nature, would, of course, indicate a bottom hole pressure of the hydrostatic pressure plus the observed pressure at the surface. This would normally amount to several hundred pounds per square inch, at the bottom.

Computation of the amounts of oil and gas produced at the surface, through differential recorder 32, FIGS. 5 and 6, is as follows:

The flowmeter is calibrated for each of several orifice sizes, on charts similar to those shown in FIG. 10. There is a separate calibration for oil and one for gas. As previously stated, under the same pressures in the flow line, a larger differential pressure is set up across the orifice when gas flows through it, than when oil is flowing through it. The recorder 32, therefore, when oil is flowing, intermittently with gas, will produce a curve similar to that shown on the chart in FIG. 8. It must be understood that all oil is produced naturally from the reservoir sand or lime, together with natural gas, dissolved in the oil similar to the gas dissolved in carbonated beverages. In some cases, also, there is free gas produced from the upper part of the reservoir, and this must all reach the surface through the same pipe. The free gas naturally produces in slugs, or separate distinct quantities, and the reduction of pressure as the combined oil and gas nears the surface causes the dissolved gas to separate from the oil and it, too, tends to collect in separate distinct volumes. In cases where the pressures are extreme, and the rate of flow is such as to keep the oil and gas in an emulsion form, this particular system requires that the oil and gas are first run through a separator. However, this is a relatively rare condition, and usually the flow may be controlled through valves or "chokes" appropriately placed.

Since the area under any curve is proportional to the phenomenon producing the curve, in FIG. 8, the calibration of the instrument permits the computation of the oil produced by taking the amplitude of the average line for the oil flow, and the time totalized over the length of the test, for the oil flows. The same may be done for the gas flows, using the gas calibration chart. The relative amounts of oil and gas, for the same period, represent the oil-gas ratio; the oil being expressed in barrels and the gas being expressed in cubic feet.

The value of these determinations, to a company or individual who produces oil, is enormous. All oil and gas, in any producing zone, within a specific oil field, is finite. It is not being manufactured continuously, but has been placed there by the forces of nature, over millions of years. It is analogous to the carbonic gas in a seltzer bottle. The gas moves the viscous oil through the formation. When the gas is permitted to escape, due to too rapid production, or the reduction of pressures due to producing in open hole, with the fluid being pumped to the surface, then a large percentage, sometimes as much as 50 to 75% of the total oil is left in the formation, and can only be produced by so-called secondary recovery methods, such as gas pressure applied from another source, or water flooding from adjacent wells. This is costly. Pumping is also costly, approaching a national average of approximately sixty-five cents per barrel. Thus, oil producers attempt to learn as early as possible, what the fundamental values of a property are, in order that they may use the most effective conservation practices for the greatest ultimate recovery.

From the foregoing description it will be readily seen that there has been produced a device as substantially fulfills the objects of the invention as set forth herein.

While this specification sets forth in detail the present and preferred construction of this invention, still in practice such deviations from such detail may be resorted to as do not form a departure from the spirit of the invention as defined in the appended claims.

Having thus described the invention, what is claimed as new and useful and is desired to be secured by Letters Patent is:

1. A method of testing possible oil producing formations within a borehole to detect the potential presence of oil, comprising: lowering into said borehole an internally sealed pipe having a continuous internal diameter exposed to and above the surface of the borehole, packing the borehole around the exterior of said pipe to prevent escape of any fluid, breaking said seal, and displaying at the surface of the borehole the pressure change within said pipe at the instant the seal is broken to indicate if oil is potentially present in said formation.

2. A method of testing possible gas producing formations within a borehole to detect the presence of gas, comprising: lowering into the borehole an internally sealed pipe having a continuous internal diameter exposed at its upper end to and above said borehole, packing the borehole around the exterior of said pipe to prevent escape of any fluid, breaking said seal, and displaying at the surface of the borehole the pressure change within said pipe at the instant the seal is broken to indicate if gas is actually present in said formation.

3. A method of testing possible oil and gas producing formations within a borehole to detect the presence of any oil and gas, comprising: lowering into the borehole an internally sealed pipe having a continuous internal diameter exposed at its upper end to and above the borehole, packing the borehole around the exterior of said pipe to prevent escape of any fluid, breaking said seal and displaying at the surface of the borehole the pressure change within said pipe at the instant the seal is broken to indicate if oil and gas are present in said formation.

4. A method of testing possible petroleum producing formations within a borehole of a well to determine the production rate of any petroleum products in said formation, comprising: sealing the lower internal end of a fluid receiving means containing atmospheric pressure, lowering the sealed means partially into a well bore, sealing the upper end of the fluid receiving means above the surface of the well, packing the borehole around the exterior of the lower end of the means to prevent the escape of fluid from the formation except into the fluid receiving means, breaking the seal from the surface of the well, and measuring and instantly displaying at the surface of the well pressure changes relative to the atmospheric pressure within the means over an exact period of time, wherefrom the production rate of oil and gas contained within the formation may if desired be subsequently determined.

References Cited in the file of this patent

UNITED STATES PATENTS

| | | |
|---|---|---|
| 2,189,919 | Moore | Feb. 13, 1940 |
| 2,340,993 | Smith | Feb. 8, 1944 |
| 2,607,222 | Lane | Aug. 19, 1952 |
| 2,611,267 | Pennington | Sept. 23, 1952 |
| 2,623,594 | Sewell | Dec. 30, 1952 |
| 2,655,038 | Barton | Oct. 13, 1953 |